United States Patent
Sugihara

(10) Patent No.: US 6,908,881 B1
(45) Date of Patent: Jun. 21, 2005

(54) VISIBLE RADIATION TYPE PHOTOCATALYST AND PRODUCTION METHOD THEREOF

(75) Inventor: Shinichi Sugihara, Yokohama (JP)

(73) Assignee: Ecodevice Laboratory Co., Ltd., Saitama (JP)

( * ) Notice: Subject to any disclaimer, the term of this patent is extended or adjusted under 35 U.S.C. 154(b) by 0 days.

(21) Appl. No.: 09/763,394

(22) PCT Filed: Aug. 13, 1999

(86) PCT No.: PCT/JP99/04396

§ 371 (c)(1),
(2), (4) Date: Jul. 2, 2001

(87) PCT Pub. No.: WO00/10706

PCT Pub. Date: Mar. 2, 2000

(30) Foreign Application Priority Data

| Aug. 21, 1998 | (JP) | 10/235112 |
| Sep. 4, 1998 | (JP) | 10/250250 |
| Oct. 9, 1998 | (JP) | 10/287747 |
| Nov. 30, 1998 | (JP) | 10/339772 |
| Mar. 11, 1999 | (JP) | 11/064665 |
| Jul. 22, 1999 | (JP) | 11/208138 |

(51) Int. Cl.$^7$ .............................................. B01J 21/06
(52) U.S. Cl. ...................................................... 502/350
(58) Field of Search ........................... 502/350; 423/239.1

(56) References Cited

U.S. PATENT DOCUMENTS

| 4,228,128 A | | 10/1980 | Esper et al. |
| 4,258,080 A | * | 3/1981 | Sonoda et al. ............ 252/518.1 |
| 4,511,638 A | | 4/1985 | Sapru et al. |
| 4,847,234 A | * | 7/1989 | Hums .......................... 502/208 |
| 5,389,340 A | | 2/1995 | Satake |
| 5,547,649 A | | 8/1996 | Beck et al. |
| 5,872,072 A | * | 2/1999 | Mouri et al. ................ 502/208 |
| 5,989,648 A | * | 11/1999 | Phillips ....................... 427/456 |
| 6,107,241 A | * | 8/2000 | Ogata et al. ................. 502/350 |
| 6,168,911 B1 | * | 1/2001 | Lelental et al. ............. 430/529 |

FOREIGN PATENT DOCUMENTS

| JP | 03013854 A | * | 1/1991 | ........... G01N/27/12 |
| JP | 4-342964 | | 11/1992 | |
| JP | 9-85099 | | 3/1997 | |
| JP | 9-234344 | | 9/1997 | |
| JP | 10-146530 | | 6/1998 | |
| JP | 11-12115 | | 1/1999 | |
| JP | 11-47609 | | 2/1999 | |
| JP | 2000-157841 | | 6/2000 | |

OTHER PUBLICATIONS

European Examination Report for Application No. 99 937 067.9–2104 dated Oct.10, 2003.

H. Idriss, and M.A. Barteau "Characterization of TiO2 surfaces active for novel organic synthesis" Catalytic Letters 26 (1994) 123, no month.

Nippon Kagaku Kaishi (Journal of the Chemical Society of Japan), 1986, No. 8, "Preparation of Titanium (IV) Oxides and Its Characterization", by Hiroyuki Noda et al., pp. 1084–1090, no month.

* cited by examiner

*Primary Examiner*—Stanley S. Silverman
*Assistant Examiner*—Edward M. Johnson
(74) *Attorney, Agent, or Firm*—Stroock & Stroock & Lavan LLP

(57) ABSTRACT

The invention is directed to a catalyst having activity under the irradiation of a visible light, the catalyst being an oxide semiconductor such as an anatase type titanium dioxide, having stable oxygen defects. A method for producing a catalyst having activity under the irradiation of a visible light which comprises treating an oxide semiconductor with hydrogen plasma or with a plasma of a rare gas element, comprising performing the treatment in a state substantially free from the intrusion of air into the treatment system is also provided. An article comprising a base material having the catalyst above provided on the surface thereof and a method for decomposing a substance, comprising bringing an object to be decomposed into contact with the catalyst above under the irradiation of a light containing at least a visible radiation are disclosed. A novel photocatalyst which enables use of a visible radiation is provided, as well as a method utilizing the photocatalyst for removing various substances containing an organic matter or bacteria by photodecomposition.

25 Claims, 3 Drawing Sheets

(a) STARTING MATERIAL TiO₂ (ST-01)
(b) STARTING MATERIAL HAS BEEN SUBJECTED TO RADIOWAVE PLASMA TREATMENT

VISIBLE RADIATION TYPE PHOTOCATALYST AND PRODUCTION METHOD THEREOF

BACKGROUND OF THE INVENTION

1. Field of the Invention

The present invention relates to a photocatalyst having a visible light activity, to a method for producing the photocatalyst, a method of photodecomposition using a light involving visible rays, and to a device using the photocatalyst.

2. Background Art

Various studies on deodorization and sterilization using photocatalysts have been made to present, and some of them have been put to practice. For instance, in WO94/11092 is disclosed a method for treating air using a photocatalyst under the irradiation of room light. In Japanese Patent Laid-Open No. 102678/1995 is disclosed a method for preventing medical infection from occurring in hospitals by using photocatalysts. In both cases, an oxide semiconductor such as titanium dioxide and the like is used as the photocatalyst, which requires an ultraviolet radiation 400 nm or shorter in wavelength for the excitation.

However, sunlight or an artificial light source used as the excitation light source also includes visible rays in addition to ultraviolet radiations. Yet, the visible rays are not used in the photocatalysts comprising oxide semiconductors such as titanium dioxide as described above; hence, such photocatalysts are extremely in efficient as viewed from the point of energy conversion efficiency.

It is well known that titanium dioxide acquires photocatalytic activity by injecting metallic ions such as chromium by using ion implantation method. However, this method is practically unfeasible because it involves the use of voluminous equipment.

On the other hand, it is reported that the catalytic activity of titanium dioxide under ultraviolet radiation can be increased by providing it with TiC coating using plasma CVD (see Japanese Patent Laid-Open No. 87857/1997). However, the literature does not teach any photocatalytic activity under the irradiation of visible light.

In the light of such circumstances, an object of the present invention is to provide a novel photocatalyst capable of using visible light.

A second object of the present invention is to provide a production method for the photocatalyst above.

Furthermore, a third object of the present invention is to provide a method for removing various types of substances including organic matter or bacteria by photode composition using the novel photocatalyst described above.

Further, a fourth object of the present invention is to provide a device using the novel photocatalyst above.

SUMMARY OF THE INVENTION

The present invention relates to a catalyst that exhibits activity under the irradiation of visible light, characterized by that it is an oxide semiconductor having stable oxygen defects.

As the oxide semiconductor, there can be mentioned, in addition to titanium dioxide, hafnium oxide, zirconium oxide, strontium titanate, a titanium oxide-zirconium oxide based complex oxide, a silicon oxide-titanium oxide based complex oxide, etc.

As the catalyst above, there can be mentioned, for instance, a catalyst having activity under the irradiation of visible light and which is an anatase type titanium dioxide having stable oxygen defects.

The present invention furthermore refers to a method for producing a visible-radiation activating type photocatalyst, comprising hydrogen plasma treating or rare gas element plasma treating an oxide semiconductor, characterized by that the treatment is performed in a treatment system under a state substantially free from the intrusion of air. In addition, the present invention relates to a method for producing a visible-radiation activating type photocatalyst characterized by that rare gas element ions are injected to at least a part of the surface of the oxide semiconductor. Further, the present invention relates to a method for producing a catalyst exhibiting activity under the irradiation of visible radiation, characterized by that the oxide semiconductor is heated in vacuum. In particular, the oxide semiconductor above can be an anatase type titanium dioxide. Furthermore, the present invention relates to a catalyst produced by the production method above according to an aspect of the present invention, which exhibits activity under the irradiation of visible radiation, and mentioned as examples of said oxide semiconductor are, for instance, titanium dioxide, hafnium oxide, zirconium oxide, strontium titanate, a titanium oxide-zirconium oxide based complex oxide, a silicon oxide-titanium oxide based complex oxide, etc.

Further, the present invention relates to an article characterized by that the catalyst according to the present invention above is provided on the surface of a base material.

In addition, the present invention relates to a method for photo decomposing a substance, comprising, under the irradiation of a light including visible rays, bringing the catalyst according to the present invention above or the article according to the present invention into contact with a medium containing the object to be decomposed, thereby effecting the decomposition of the object to be decomposed.

Further, the present invention refers to a device for use in photodecomposition, comprising a photocatalyst unit having the catalyst according to the present invention provided on the surface of a base material and a light source for irradiating a light including visible radiation to the photocatalyst above.

The present invention refers, furthermore, to an electrode for use in solar cells and to an electrode for use in the photodecomposition of water.

DESCRIPTION OF THE EMBODIMENTS OF THE INVENTION

Figure 1:
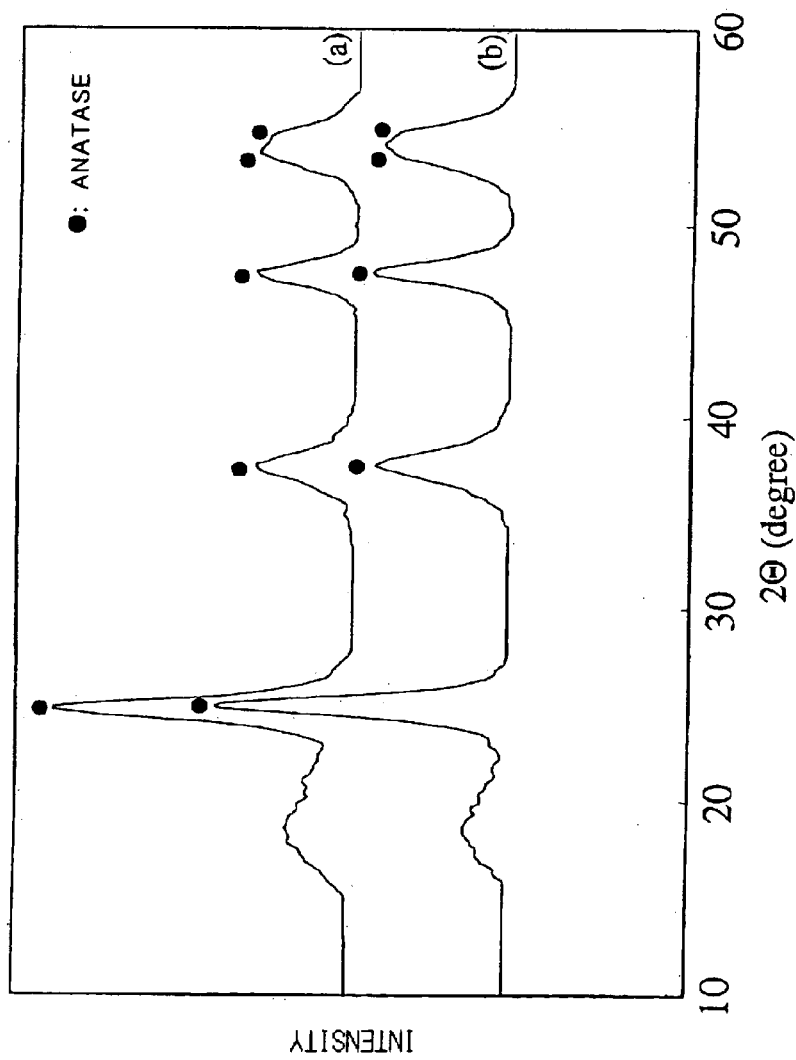
FIG. 1 is a diagram showing the X-ray diffractograms for each of the samples obtained before and after plasma treatment.

The catalyst according to the present invention is characterized by that it is an oxide semiconductor having stable oxygen defects. Furthermore, the catalyst according to the present invention is a catalyst that exhibits activity under the irradiation of a visible light. As the oxide semiconductor above, there can be mentioned, for instance, titanium dioxide, hafnium oxide, zirconium oxide, strontium titanate, a titanium oxide-zirconium oxide based complex oxide, a silicon oxide-titanium oxide based complex oxide, etc., but is not only limited thereto. The oxide semiconductor may be a rutile type titanium dioxide or an anatase type titanium dioxide. Particularly preferred as the oxide semiconductor from the viewpoint of practice is an anatase type titanium dioxide.

The case of anatase type titanium dioxide, which is a representative oxide semiconductor, is described below. The catalyst according to an embodiment of the present invention is characterized by that it is an anatase type titanium dioxide having stable oxygen defects, and that it exhibits activity under the irradiation of a visible light.

Further, the catalyst according to the present invention maybe a titanium dioxide which yields a diffractogram obtainable by X-ray diffraction (XRD) substantially free from patterns other than that of anatase type titanium dioxide.

The degree of oxygen defects of the anatase type titanium dioxide that is used as the catalyst according to the present invention can be specified by the ratio of peak area obtained by X-ray photoelectron spectroscopy assigned to the 1s electrons of oxygen participating in the bonds with titanium to that assigned to the 2p electrons of titanium (O1s/Ti2p), and the value is, for instance, 1.99 or lower. A more preferred peak area ratio (O1s/Ti2p) is in a range of from 1.5 to 1.95. The stability of the oxygen defects of the oxide semiconductor signifies, in case the catalyst according to the present invention is, for instance, an anatase type titanium dioxide having oxygen defects, that the area ratio (O1s/Ti2p) described above is maintained substantially constant even in case the catalyst is left in air for 1 week or longer. It is well known that oxygen defects generate when titanium dioxide is reduced by gaseous hydrogen, however, the oxygen defects that are obtained by reduction using gaseous hydrogen are extremely unstable, and such defects disappear in a short period when left in air. On the other hand, the oxygen defects that are present in the catalyst according to the present invention are extremely stable, such that they remain stable for at least half a year even when the catalyst is left under ambient. Furthermore, when the catalyst according to the present invention is used in a photocatalytic reaction, the oxygen defects above do not diminish in a short period of time, but it can be used stably as a catalyst.

Concerning the band gap of titanium dioxide, an anatase type yields a value of 3.2 eV, and a rutile type yields 3.0 eV. Both types are activated solely by ultraviolet radiation, but the catalyst according to the present invention not only exhibits photoactivity under the irradiation of an ultraviolet radiation inherent to titanium dioxide, but also is photoactivated by visible light alone. The degree of photoactivation of the catalyst according to the present invention obtainable by the irradiation of a visible light depends on the quantity of the oxygen defects and the like; however, in case of an anatase type titanium dioxide, for instance, if the activity obtainable under the irradiation of a black light radiation with radiations 400 nm or longer in wavelength being cut off is taken as 100, an activity of at least 5 can be obtained under an irradiation of light radiated from a halogen lamp with radiations 420 nm or shorter in wavelength being cut off, and in general, an activity of 20 or higher is achieved. Furthermore, the activity of the catalyst according to the present invention under the irradiation of a visible light is attributed to the oxidation activity or the reduction activity inherent to anatase type titanium dioxide.

The activity of the catalyst according to the present invention under the irradiation of a visible light signifies that the catalyst at least exhibits an NOx oxidation activity under the irradiation of visible radiations 400 to 600 nm in wavelength. The titanium oxide known heretofore exhibits activity of a certain degree under the irradiation of a visible light having a wavelength in the vicinity of 400 nm attributed to the band gap described above. However, no catalysts having a photocatalytic activity for visible radiations in the wavelength region of longer than 500 nm up to a vicinity of 600 nm are known to present.

For instance, the catalyst according to the present invention obtainable by the hydrogen plasma treatment or by the rare gas element plasma treatment yields a NOx oxidation activity (NO removal activity) of at least 30 under the irradiation of a light 460 nm in wavelength, preferably 50 or higher, and most preferably, 60 or higher, with respect to the NOx oxidation activity (No removal activity) of 100 achieved under the irradiation of a light 360 nm in wavelength. Further, the NOx oxidation activity (NO removal activity) obtained under the irradiation of a light 560 nm in wavelength is at least 5, preferably 10 or higher, and most preferably, 15 or higher.

In case of an anatase type titanium oxide manufactured by Ishihara Sangyo Kaisha which is reputed to have a high photocatalytic activity, the NOx oxidation activity (NO removal activity) obtained under the irradiation of a light 460 nm in wavelength is approximately null, and completely no activity is obtained under the irradiation of a light 560 nm in wavelength, with respect to the NOx oxidation activity (NO removal activity) of 100 obtained under the irradiation of a light 360 nm in wavelength.

For the measurement of the NOx oxidation activity (NO removal activity) as referred above, a 300-W xenon lamp was used for the light source, and a monochromatic light having a half band width of 20 nm was irradiated by using an irradiation apparatus manufactured by JASCO. More specifically, the radiations having a wavelength of 360 nm, 460 nm, and 560 nm are each a monochromatic light having a half band width of 20 nm.

The catalyst having a photocatalytic activity with respect to a visible light in the wavelength region up to the vicinity of 600 nm in wavelength is, for instance, a titanium oxide having stable oxygen defects, which yields a signal having a g value of from 2.003 to 2.004 in the ESR measured in darkness at 77K under vacuum, provided that they yield a signal higher in intensity than the g value of from 2.003 to 2.004 above when measured at least under the irradiation of light in the wavelength region of from 420 to 600 nm at 77K in vacuum. The signals having a g value of from 2.003 to 2.004 measured by ESR under the conditions above are known to be assigned to the oxygen defects of titanium oxide. However, it is not known that a photocatalyst having excellent photoactivity with respect to visible radiations can be provided in case the above signals measured under the irradiation of light in the wavelength region of from 420 to 600 nm at 77K in vacuum is greater in intensity as compared to those obtained in darkness as above.

Preferably, the ratio of the intensity I0 of the ESR signal having a measured g value in the range of from 2.003 to 2.004 under darkness at 77K in vacuum to the intensity IL of the ESR signal having a measured g value in the range of from 2.003 to 2.004 at 77K in vacuum under the irradiation of a radiation in the wavelength region of at least 420 to 600 nm, IL/I0, is over 1; more preferably, the ratio (IL/I0) is 1.3 or higher, and most preferably, it is 1.5 or higher.

In addition to above, preferred from the viewpoint of obtaining a photocatalyst having a higher activity with respect to visible radiations is that a signal assigned to $Ti^{3+}$, which yields a g value of 1.96 when measured by ESR in darkness at 77K in vacuum, is substantially not observed.

The same applies to oxide semiconductors other than titanium dioxide. Hence, such an oxide semiconductor is photoactivated not only under the irradiation of an ultraviolet radiation, but by the irradiation of a visible radiation alone. The degree of photoactivation by the irradiation of a visible light depends on the quantity of oxygen defects and the like. The activity of the catalyst according to the present invention under the irradiation of a visible light is attributed to the oxidation activity or the reduction activity inherent to the oxide semiconductor.

Furthermore, the activity of the catalyst under the irradiation of a visible light according to the present invention is a decomposition activity for inorganic and organic substances, or a bactericidal activity.

There is no particular limitation concerning the shape of the catalyst according to the present invention, and can be used in a granular, a thin-film like, or a sheet-like shape. However, the shape is not limited thereto. The granular oxide semiconductor (catalyst) may be finely size reduced with an aim to increase the activity, or maybe pelletized to ease the handling thereof. Concerning the surface of the oxide semiconductor (catalyst) shaped into thin films or sheets, it may be roughened to increase the activity. Furthermore, other components may be added to the titanium dioxide above at such a degree that their addition does not impair the activity to visible light of the catalyst according to the present invention.

The catalyst according to the present invention can be obtained, for instance, by a method comprising treating an oxide semiconductor with hydrogen plasma or a plasma of a rare gas element, and the method is characterized by that the treatment is performed in a state substantially free from the intrusion of air into the treatment system.

The oxide semiconductor above may be, for instance, titanium dioxide, hafnium oxide, zirconium oxide, strontium titanate, a titanium oxide-zirconium oxide based complex oxide, a silicon oxide-titanium oxide based complex oxide, etc.

The anatase type titanium dioxide that is used as the starting material may be obtained by a wet method; for instance, there may be used a titanium dioxide produced by sulfuric acid method, or a titanium dioxide prepared by a dry method.

The treatment using hydrogen plasma can be performed by generating hydrogen plasma obtained by introducing gaseous hydrogen to an oxide semiconductor provided under a reduced pressure state while irradiating an electromagnetic wave, for instance, a microwave or a radio wave, and exposing the oxygen semiconductor to the plasma for a predetermined duration of time. In the treatment using a plasma of a rare gas element, the treatment can be carried out by generating a plasma of a rare gas element obtained by introducing gaseous rare gas element to an oxide semiconductor provided under a reduced pressure state while irradiating an electromagnetic wave, for instance, a microwave or a radio wave, and exposing the oxygen semiconductor to the plasma for a predetermined duration of time. As the rare gas element, there can be mentioned, for instance, helium, neon, argon, krypton, xenon, radon, etc., however, from the viewpoint of ease in availability, preferred are the use of helium, neon, argon, etc.

The reduced pressure state is, for instance, 10 Torr or lower, or may be 2 Torr or lower. The output of the electromagnetic wave can be properly selected by taking the quantity of the oxide semiconductor to be treated or the state of plasma generation into consideration. The amount of gaseous hydrogen or the gaseous rare gas element to be introduced into the system can be properly selected by taking the reduced pressure state or the state of plasma generation into consideration. The time duration of exposing the oxide semiconductor to the hydrogen plasma or the plasma of the rare gas element is properly selected depending on the quantity of oxygen defects that are introduced into the oxide semiconductor.

The production method according to the present invention is characterized by that it is performed Ian state substantially free from the intrusion of air into the plasma treatment system. The state "substantially free from the intrusion of air into the plasma treatment system" signifies that the vacuum degree inside the tightly sealed system takes at least 10 minutes to make a change of 1 Torr. The less the intrusion of air occurs, the more easily the oxygen defects are introduced into the oxide semiconductor.

Furthermore, if desired, the hydrogen plasma above may contain gases other than gaseous hydrogen. As gases other than gaseous hydrogen, there can be mentioned, for instance, those of rare gas elements. In the production method according to the present invention, oxygen defects can be introduced into the oxide semiconductor by using plasma of hydrogen or of rare gas element, and the coexistence of the rare gas element together with hydrogen plasma is not essentially required for the introduction of oxygen defects. The same can be said to the case of using the plasma of rare gas element. Thus, the plasma of a rare gas element may contain gases other than those of rare gas elements if desired, and as such gases, there can be mentioned gaseous hydrogen. However, the coexistence of hydrogen in the plasma of rare gas element is not essential in introducing oxygen defects.

The catalyst according to the present invention can be also produced by a method comprising ion-injecting the ions of a rare gas element to at least a part of the surface of the oxide semiconductor. The ion implantation method can be carried out by using the methods and apparatuses currently used in the semiconductor industry. The conditions of ion implantation can be properly determined depending on the quantity of the ions of the rare gas element, the type of the oxide semiconductor, etc. Further, as the rare gas elements, there can be mentioned, for instance, helium, neon, argon, krypton, xenon, radon, etc., however, from the viewpoint of ease in availability, preferred are the use of helium, neon, argon, etc.

Furthermore, the production of the catalyst according to the present invention is not only limited to powder, but there can also be used titanium oxide fixed to a substrate by using a proper,binder, etc.

The catalyst according to the present invention may be produced by a method comprising heating an oxide semiconductor in vacuum. For instance, by subjecting titanium dioxide to a heat treatment in high vacuum, or by subjecting it to hydrogen reduction while heating under high vacuum, it is known that oxygen defects are generated to cause visible light absorption. However, it is not known that the resulting titanium dioxide containing oxygen defects function as catalysts exhibiting activity under the irradiation of a visible light The production method above maybe, for instance, a method comprising heating an anatase type titanium dioxide to a temperature of 400° C. or higher under a vacuum of 1 Torr or lower. The time duration of the treatment may be properly set depending on the vacuum degree and the temperature, but in case of a treatment at 400° C. under a vacuum of 0.1 Torr or lower, the time duration may be set in a range of from 30 minutes to 1 hour.

As described above, an anatase type titanium dioxide subjected to a hydrogen plasma treatment or a rare gas element plasma treatment, or such injected with ions contains stable oxygen defects, and become a catalyst exhibiting activity under the irradiation of a visible light. Similarly, a rutile type titanium dioxide, zirconium oxide, hafnium oxide, strontium titanate, etc., also can provide a catalyst exhibiting activity under the irradiation of a visible light by subjecting them to a hydrogen plasma treatment or a rare gas element plasma treatment, or by injecting ions thereto. However, the intensity of activity and the wavelength dependence of the activity under the irradiation of a visible light greatly differ depending on the type of the oxide semiconductor and the treatment method. zirconium oxide is a semiconductor, however, it has a large band gap, and was thereby believed to show no function as a practically useful photocatalyst. Still, however, by subjecting it to a hydrogen plasma treatment or a rare gas element plasma treatment, or by injecting ions thereto in accordance with the production method of the present invention, it was found to provide a catalyst exhibiting activity under the irradiation of UVa or a visible radiation.

As a result of surface analysis using ESCA, a zirconium oxide subjected to a hydrogen plasma treatment or a treatment using a rare gas element plasma, or such injected with ions was observed to generate a trace quantity of zirconium carbide and oxygen defects. A rutile type titanium dioxide functions as a photocatalyst under the irradiation of an ultraviolet radiation, however, it was not practically used as a photocatalyst because it is inferior in activity as compared with an anatase type counterpart. However, it has been found that the rutile type titanium dioxide can be used as a catalyst having activity under the irradiation of a visible light by treating it with hydrogen plasma or plasma of a rare gas element, or by treating it by ion implantation in accordance with the production methods of the present invention. Conventionally, no activity had been found on hafnium oxide and strontium titanate under the irradiation of a visible light; however, activity under the irradiation of a visible light was confirmed in the case of the catalyst having stable oxygen defects according to the present invention.

The present invention furthermore relates to the catalyst according to the present invention as described above, or to an article having provided with the catalyst produced by the production method according to the present invention on the surface of a base material. As the base material, for instance, there can be used an exterior wall of a building, an exterior plane of a roof or a ceiling, an outer plane or an inner plane of a window glass, an interior wall of a room, a floor or a ceiling, a blind, a curtain, a protective wall of highway roads, an inner wall inside a tunnel, an outer plane or a reflective plane of an illuminating light, an interior surface of a vehicle, a plane of a mirror, etc.

The catalyst can be provided to the base material by, for instance, coating or spraying the catalyst according to the present invention or a paint containing the particles of the catalyst produced by the production method according to the present invention. Furthermore, a base material having a layer of an oxide semiconductor such as titanium dioxide may be subjected to a hydrogen plasma treatment in accordance with the production method according to the present invention to provide the surface of the oxide semiconductor layer as the catalyst according to the present invention to thereby obtain the article according to the present invention.

Further, the method for photo decomposing a substance according to the present invention comprises bringing a medium containing the object to be decomposed into contact with the catalyst according to the present invention, a catalyst produced by the production method according to the present invention, or an article according to the present invention under the irradiation of a light containing a visible light, so that the desired object to be decomposed may thereby decomposed.

The object to be decomposed may be at least one type of substance selected from the group consisting of inorganic compounds, organic compounds, microorganisms, and tumor cells. The medium may be, for instance, water or air. More specifically mentioned as such a medium is air having bad odor or a harmful substance (e.g., nitrogen oxides, formalin, etc.), organic matters (e.g., waste water containing crude oil or petroleum products, marine water, etc.). The light containing visible light may be a solar radiation or an artificial light. An artificial light source relates to any type of a light source capable of supplying a light containing visible light, such as the rays irradiated from a fluorescent lamp, an incandescent lamp, a halogen lamp, etc.

Further, the photodecomposition device according to the present invention comprises a photocatalyst unit having the catalyst according to the present invention or the catalyst produced by the production method according to the present invention provided on the surface of abase material, and a light source for irradiating a light containing a light containing a visible light to the aforementioned photocatalyst. The photocatalyst unit can be, for instance, a filter of an air cleaner. As the light source for irradiating a visible light, there can be mentioned, for instance, a fluorescent lamp, an incandescent lamp, a halogen lamp, etc.

In case an air contains a substance that is the source of bad odor, by using the method or the device according to the present invention and by bringing an air containing the object to be decomposed into contact with the photocatalyst or the photocatalyst unit (article) under the irradiation of a light containing at least a visible radiation, the source substance of the bad odor contained in the air can be decomposed by bringing it into contact with the catalyst to thereby reduce or remove the bad odor. In case the air contains bacteria, at least a part of the bacteria contained in air can be destroyed by bringing the air into contact with the catalyst. If the air contains both bad odor and bacteria, it can be readily understood that the aforementioned reactions occur in parallel with each other.

By using the method or the device according to the present invention and by bringing water containing the object to be decomposed into contact with the photocatalyst or the unit (article) using the photocatalyst according to the present invention under the irradiation of a light at least containing a visible radiation, and in case the water contains an organic matter, the organic matter contained in the water can be decomposed by its contact with the catalyst. If the water contains bacteria, the bacteria present in the water can be destroyed by bringing the water into contact with the catalyst. If the water contains both organic matters and bacteria, it can be readily understood that the aforementioned reactions occur in parallel with each other.

Furthermore, the electrode for solar cells and the electrode for photodecomposition of water according to the present invention comprise a material based on an oxide semiconductor, such as an anatase type titanium dioxide, containing stable oxygen defects, and the details of the materials and the production methods are as described above. Further, the electrode for solar cells and the electrode for photodecomposition of water according to the present invention comprise a catalyst made of an oxide semiconductor subjected to a treatment according to the production method of the present invention. In case of applying the present invention to a solar cell electrode, a solar cell can be assembled by using a known system while taking the characteristics of the present electrode into consideration. In case of applying the present invention to an electrode for photo-decomposing water, the photodecomposition of water can be performed by using a known method and device.

EXAMPLES

The present invention is described in further detail by making reference to the non-limiting examples as follows.

Example 1

A 10-g portion of a powder (60 mesh or less in granularity) of an anatase type titanium dioxide was placed inside a 200-ml volume quartz reaction tube. The quartz reaction tube was connected to a plasma generating apparatus, and after evacuating the inside of the system by using a vacuum pump, a 400-W power electromagnetic wave (at a frequency of 2.45 GHz) was irradiated to the powder of anatase type titanium dioxide placed inside the reaction tube to thereby generate a plasma by using a Tesla coil. Then, gaseous $H_2$ was introduced inside the system at a flow rate of 30 ml/min to set the pressure inside the system to about 1 Torr. The treatment was continued for 30 minutes while stirring the anatase type titanium dioxide powder placed inside the reaction tube.

Time duration of 40 minutes was necessary to increase the vacuum degree inside the plasma treatment system for 1 Torr without introducing a gas and while cutting off the pump evacuation.

The anatase type titanium dioxide powder thus obtained was subjected to X-ray photoelectron spectroscopy (XPS), and the area of the peaks assigned to the 2p-electron of titanium (458.8 eV ($Ti2p_{3/2}$) and 464.6 eV ($Ti2p_{1/2}$)) as well as that of the peak assigned to the 1s-electron of the oxygen bonded to titanium (531.7 eV (O1s)) was obtained. The area ratio (O1s/Ti2p) was found to be 1.91. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.91. The sample was further left for 1 month, but no change was found on the area ratio (O1s/Ti2p).

The samples before and after the plasma treatment above were each subjected to X-ray diffraction analysis, and, as a result, no change was observed between the anatase type titanium dioxide samples before and after the plasma treatment.

Example 2

A 10-g portion of a powder (60 mesh or less in granularity) of an anatase type titanium dioxide was placed inside a 200-ml volume quartz reaction tube. The quartz reaction tube was connected to a plasma generating apparatus, and after evacuating the inside of the system by using a vacuum pump, a 400-W power electromagnetic wave (at a frequency of 2.45 GHz) was irradiated to the powder of anatase type titanium dioxide placed inside the reaction tube to thereby generate a plasma by using a Tesla coil. Then, gaseous argon was introduced inside the system at a flow rate of 10 ml/min to set the pressure inside the system to about 1 Torr. The treatment was continued for 120 minutes while stirring the anatase type titanium dioxide powder placed inside the reaction tube.

Time duration of 40 minutes was necessary to increase the vacuum degree inside the plasma treatment system for 1 Torr without introducing a gas and while cutting off the pump evacuation. The anatase type titanium dioxide powder thus obtained was subjected to X-ray photoelectron spectroscopy (XPS), and the area of the peaks assigned to the 2p-electron of titanium (459.5 eV ($Ti2p_{3/2}$) and 465.4 eV ($Ti2p_{1/2}$)) as well as that of the peak assigned to the 1s-electron of the oxygen bonded to titanium (530.0 eV (O1s)) was obtained. The area ratio (O1s/Ti2p) was found to be 1.89. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.89. The sample was further left for 1 month, but no change was found on the area ratio (O1s/Ti2p).

The samples before and after the plasma treatment above were each subjected to X-ray diffraction analysis, and, as a result, no change was observed between the anatase type titanium dioxide samples obtained before and after the plasma treatment.

Example 3

A production method of a catalyst according to the present invention comprising injecting ions of rare gas elements to the surface of an oxide semiconductor, an anatase type titanium dioxide, is described below.

As the equipment was used a medium current ion implantation apparatus, ULVAC IKX-7000 manufactured by ULVAC Co., Ltd.

The method comprises, after introducing gaseous argon, irradiating electron beam to the sample for ionization, subjecting the ionized species to mass spectroscopy to separate and take out argon ions, and the argon ions were accelerated in an accelerator (at a direct current voltage of 100 kV) to inject argon ions to the target.

As the target, a glass plate 6 cm in diameter (which is about 0.2 mm in thickness and which is coated with a carbon film at a thickness of less than 1 Mm in order to ensure conductivity necessary for an ion implantation method) coated with 0.2 g of ST-01 was used.

Argon ions were injected at a density of $5 \times 10^{16}$ ions/cm$^2$. The thus obtained anatase type titanium dioxide sample was subjected to X-ray photoelectron spectroscopy (XPS), and the area of the peaks assigned to the 2p-electron of titanium (458.6 eV ($Ti2p_{3/2}$) and 464.3 eV ($Ti2p_{1/2}$)) as well as that of the peak assigned to the 1s-electron of the oxygen bonded to titanium (529.7 eV (O1s)) was obtained. The area ratio (O1s/Ti2p) was found to be 1.76. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.76. The sample was further left for 1 month, but no change was found on the area ratio (O1s/Ti2p).

Test Example 1
(Decomposition of Acetaldehyde Using Visible Light)

A 0.2-g portion of each of the samples prepared in Examples 1 and 2 above was applied to a glass plate (6×6 cm), and the samples (plate) prepared in Example 3 were each placed inside a glass bell jar-type reaction apparatus (1.9 liter in volume) As the light source, a halogen lamp (JDR110V 75WN/S-EK manufactured by Toshiba Lightech Co., Ltd.) was used together with a glass filter to cut off ultraviolet radiations 420 nm or shorter in wavelength. The center luminance of the light source was 100,000 Lx.

After sufficiently evacuating the inside of the system, acetaldehyde was injected into the reaction vessel to prepare a reaction gas having the predetermined concentration (1,000 ppm). After the adsorption equilibrium of acetaldehyde was achieved, light irradiation was performed for a predetermined duration of time. The reaction gas was analyzed by using gas chromatography (FID).

The decrease in the concentration of acetaldehyde after the light irradiation is shown in the Table below. For comparison, a similar test was performed on a sample not subjected to the plasma treatment, and the result is given in Table 1 as Comparative Example 1

TABLE 1

|  | Halogen Lamp (with radiations 420 nm or shorter in wavelength cut off) | Time duration of light irradiation (minutes) |
| --- | --- | --- |
| Example 1 | 400 ppm | 120 |
| Example 2 | 330 ppm | 90 |
| Example 3 | 520 ppm | 60 |
| Comparative Example 1 | 0 ppm | 120 |

From the results shown in Table 1, it can be understood that the photocatalysts according to the present invention, which are each anatase type titanium dioxide and which contain stable oxygen defects, exhibit high ability in the photodecomposition of acetaldehyde under irradiation of a visible light. Furthermore, the material used in Comparative Example 1 shows high adsorption to acetaldehyde, but had no photodecomposition effect under the irradiation of a visible light.

Example 4

A 5-g portion of a powder of an anatase type titanium dioxide (ST-01, manufactured by Ishihara Sangyo Kaisha) was placed inside a quartz reaction tube 5 cm in inner diameter and 100 cm in length. A RF plasma generating apparatus was attached to the quartz reaction tube, and after evacuating the inside of the reaction tube system to 0.1 Torr by using a vacuum pump, a 500-W power electromagnetic wave (at a frequency of 13.56 GHz) was irradiated to the powder of anatase type titanium dioxide placed inside the reaction tube to thereby generate a plasma. Then, gaseous $H_2$ was introduced inside the system at a flow rate of 500 ml/min to set the pressure inside the system to about 1 Torr. The treatment was continued for 30 minutes while stirring the anatase type titanium dioxide powder placed inside the reaction tube. Further, the wall of the quartz tube was heated to 400° C. by resistance heating using a nichrome wire, and was maintained at the same temperature throughout the reaction.

The anatase type titanium dioxide powder thus obtained was subjected to X-ray photoelectron spectroscopy (XPS), and the area of the peaks assigned to the 2p-electron of titanium (458.8 eV ($Ti2p_{3/2}$) and 464.6 eV ($Ti2p_{1/2}$)) as well as that of the peak assigned to the 1s-electron of the oxygen bonded to titanium (531.7 eV (O1s)) was obtained. The area ratio (O1s/Ti2p) was found to be 1.94. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.94. The sample was further left for 1 month, but no change was found on the area ratio (O1s/Ti2p).

The samples before and after the plasma treatment above were each subjected to X-ray diffraction analysis, and, as a result, no change was observed between the anatase type titanium dioxide samples obtained before and after the plasma treatment. In FIG. 1 are shown the X-ray diffraction patterns for the sample before plasma treatment (a) and the sample after plasma treatment (b).

Furthermore, the ESR spectra of the samples before and after the treatment were obtained. The measurements were performed in vacuum (0.1 Torr) and at a temperature of 77 K. The measurements were performed under conditions as follows.

[Basic Parameters]
Temperature at measurement: 77K
Irradiation frequency: 9.2 to 9.4 MHz
Field: 330 mT±25 mT
Scanning time: 4 minutes
Mod.: 0.1 mT
Gain: 5×10
Power: 0.1 mW
Time constant: 0.03 seconds
Light source: High pressure mercury lamp 500 W
Filter: L-42
[Sample Preparation]
Vacuum evacuation for 1 hour or longer
[Calculation of g-value]
$Mn^{2+}$ marker ($g_{min}$=1.981) was taken as the standard, and calculations were made in accordance with the following equation:

$$g = g_{mn} \times H_{mn}/(H_{mn} + \Delta H)$$

where, $H_{mn}$ represents the magnetic field of $Mn^{2+}$ marker, and $\Delta H$ represents the change in magnetic field from $H_{mn}$.

Figure 2:
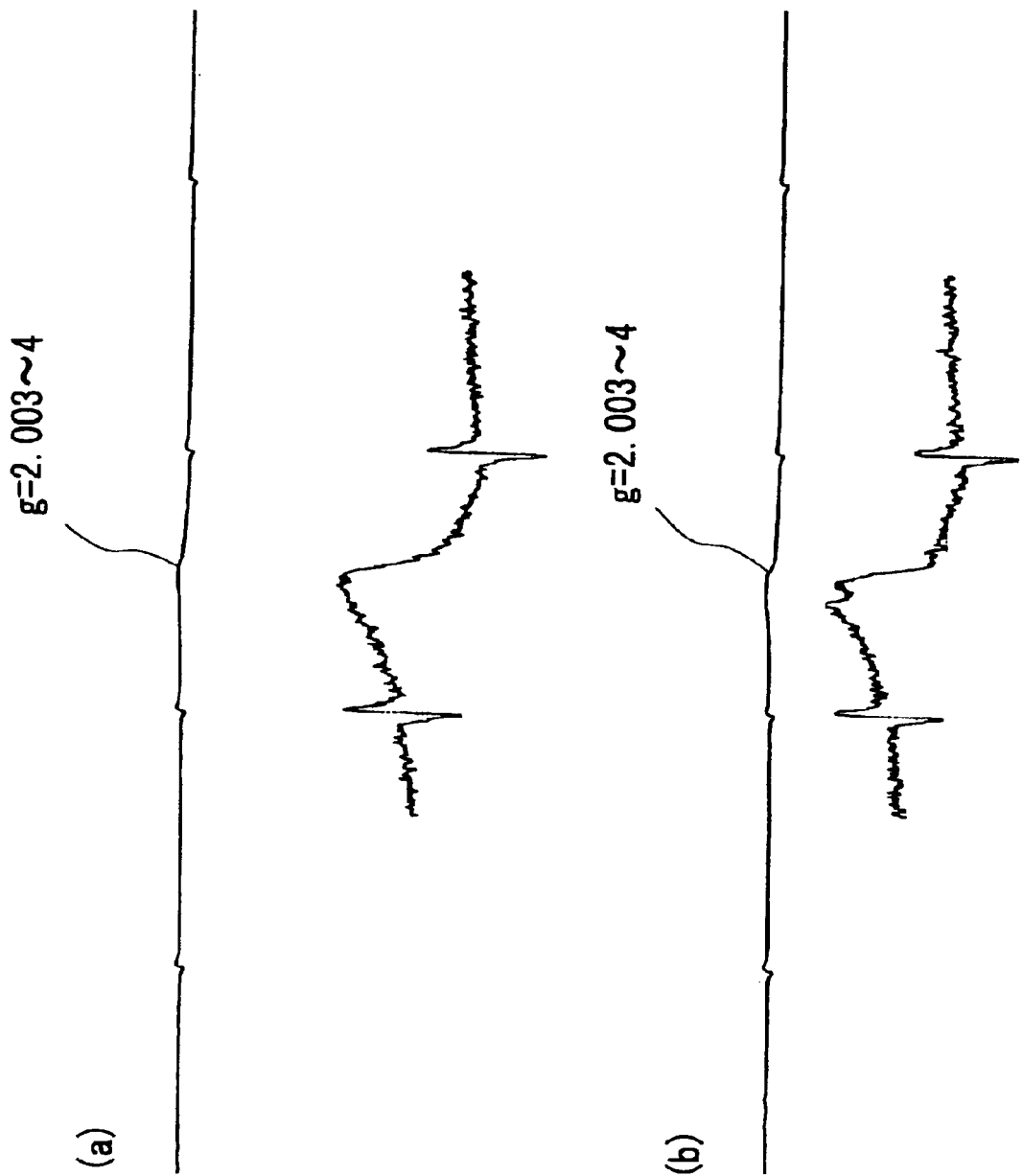
FIG. 2 is a diagram showing the ESR spectrum of a specimen (anatase-type titanium dioxide) before plasma treatment.

The ESR spectra of the sample before subjecting it to plasma treatment are shown in FIG. 2. Referring to the figure, (a) shows the ESR spectrum in darkness, and (b) shows the ESR spectrum obtained in a state in which light was irradiated through a filter (L-42) cutting off the light 420 nm or shorter in wavelength from the light emitted from a 500-W high pressure mercury lamp.

Figure 3:
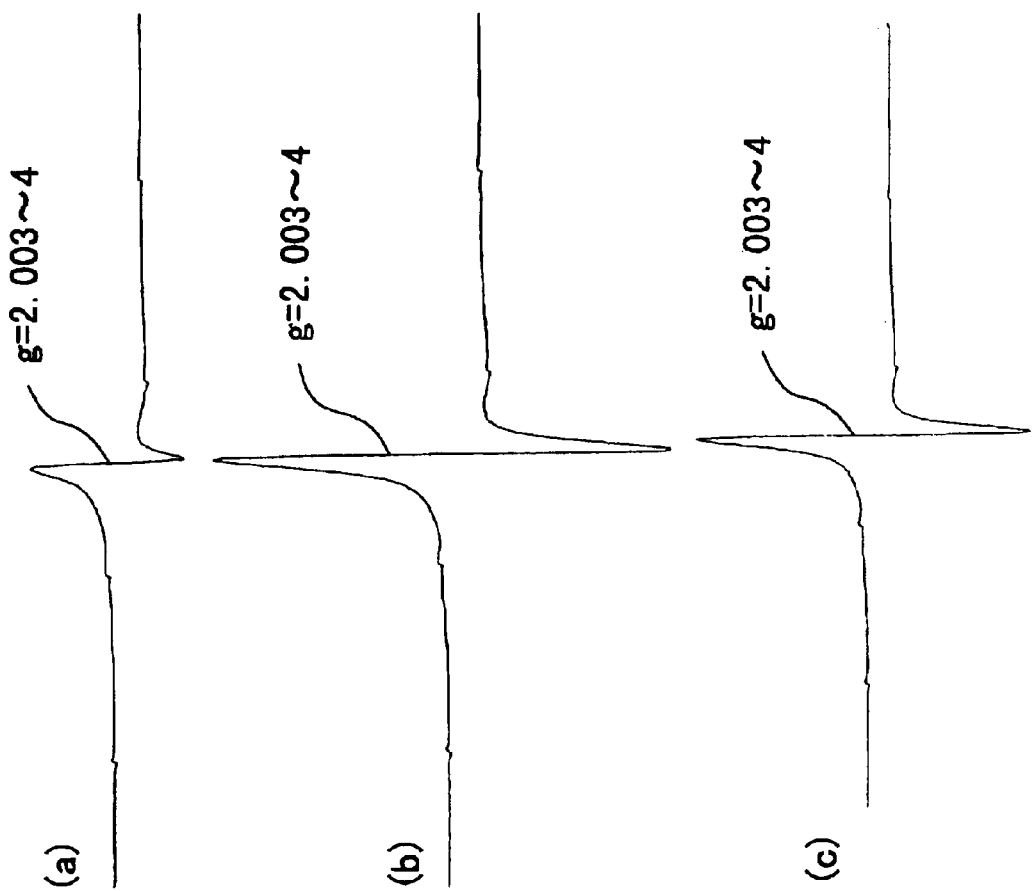
FIG. 3 is a diagram showing the ESR spectrum of a catalyst according to the present invention (a specimen (anatase-type titanium dioxide) after subjecting it to plasma treatment)

In FIG. 3 are shown the ESR spectra of the sample after it was subjected to plasma treatment. Referring to the figure, (a) shows the ESR spectrum in darkness, (b) shows the ESR spectrum obtained in a state in which light was irradiated through a filter (L-42) cutting off the light 420 nm or shorter in wavelength from the light emitted from a 500-W high pressure mercury lamp, and (c) shows the ESR spectrum obtained in a state in which light was irradiated without using the filter (L-42).

The ESR spectra in FIG. 2 and FIG. 3 were obtained under the same conditions. On comparing the results shown in the figures, the catalyst according to the present invention yields a characteristic signal at a g value of 2.003 to 2.004, which was not observed for the starting material. Furthermore, this signal was found to be amplified under the irradiation of light in which the radiations 420 nm or shorter in wavelength are cut off. The catalyst according to the present invention yielded a signal which increases its intensity under the irradiation of a visible light 420 nm or longer in wavelength at a g value of from 2.003 to 2.004. Moreover, this peak was found to be maintained on re-measuring the sample after allowing it to stand in air for 1 week. Further, no signal assigned to $Ti^{3+}$, which should appear at a g value of 1.96, was found for the catalyst obtained in Example 4.

Test Example 2
(Measurement of NOx Oxidation Activity)

A 0.2-g portion of the sample prepared in Example 4 was applied to a glass plate (6×6 cm), and the sample (plate) was placed inside a Pyrex glass reaction vessel (160 mm in inner diameter and 25 mm in thickness). A 300-W xenon lamp was used as the light source, and light was irradiated as a monochromatic light having a half width value of 20 nm by using a JASCO irradiating apparatus.

Then, a mock contaminated air (containing 1.0 ppm of NO) having a humidity of 0% RH was continuously supplied to the reaction vessel above at a flow rate of 1.5 liter/minute, and the change in concentration of NO was monitored at the reaction exit. The concentration of NO was measured by means of chemical emission method using ozone. The removal ratio for NOx was obtained from the cumulative monitored value for 24 hours. The results are shown in Table 2. In Table 2, the results obtained on the sample (ST-01) used for the starting material are also shown for comparison.

TABLE 2

|  | Wavelength (nm) | | |
| --- | --- | --- | --- |
|  | 360 | 460 | 560 |
|  | NO removal ratio (%) | | |
| Example 4 | 28.7 | 17.1 | 4.7 |
| Starting material (ST-01) | 28.1 | 0.2 | 0 |

From the results shown in Table 2, it can be understood that the photocatalyst according to the present invention (the sample obtained in Example 4), which is an anatase type titanium dioxide and which contains stable oxygen defects, exhibits that it effectively removes nitrogen oxides by oxidation under the irradiation of a visible light of at least 560 nm or shorter in wavelength. Although not shown in Table 2, the photocatalyst according to the present invention (the sample obtained in Example 4), which is an anatase type titanium dioxide and which contains stable oxygen defects, possessed an effect of effectively removing nitrogen oxides by oxidation under the irradiation of a visible light of at least 600 nm or shorter in wavelength.

Test Example 3
(Test on the Reduction of Benzoic Acid)

A 0.02-g portion of the sample prepared in Example 4 was placed inside a Pyrex glass reaction vessel (40 ml in volume) together with 25 ml of benzoic acid 0.01 mol/l in concentration, and was stirred with a magnetic stirrer. A halogen lamp controlled with a voltage regulator as to yield a power of 70 mW at a wavelength of 500 nm was used as the light source. The distance between the halogen lamp and the reaction cell was set at 10 cm. A sharp cut filter was placed between the halogen lamp and the reaction cell to cut off ultraviolet radiations. For the reaction, the system was left for 24 hours to establish adsorption equilibrium, and light was irradiated thereto for 48 hours to initiate the reaction.

The state before the reaction was compared with that after the reaction by measuring the concentration of benzoic acid; i.e., the absorbance at a wavelength of 228 nm in visible to ultraviolet light absorption spectrum was measured. No light was allowed during the reaction and the measurement.

As a result, the decomposition ratio of benzoic acid after 48 hours was found to be 20.46%. However, no decomposition of benzoic acid was found in case of using titanium oxide employed for the starting material under the conditions above.

Example 5

A 10-g portion of a powder of an anatase type titanium dioxide (ST-01, manufactured by Ishihara Sangyo Kaisha) was placed inside a quartz reaction tube 400 ml in volume. The quartz reaction tube was connected to a plasma generating apparatus, and after evacuating the inside of the system by using a vacuum pump, a 200-W power electromagnetic wave (at a frequency of 2.45 GHz) was irradiated to the powder of anatase type titanium dioxide placed inside the reaction tube to thereby generate a plasma by using a Tesla coil. Then, gaseous $H_2$ was introduced inside the system at a flow rate of 30 ml/min to set the pressure inside the system to about 1 Torr. The treatment was continued for 10 minutes while stirring the anatase type titanium dioxide powder placed inside the reaction tube.

Time duration of 40 minutes was necessary to increase the vacuum degree inside the plasma treatment system for 1 Torr without introducing a gas and while cutting off the pump evacuation.

The anatase type titanium dioxide powder thus obtained was subjected to X-ray photoelectron spectroscopy (XPS), and the area of the peaks assigned to the 2p-electron of titanium (458.8 eV ($Ti2p_{3/2}$) and 464.6 eV ($Ti2p_{1/2}$)) as well as that of the peak assigned to the 1s-electron of the oxygen bonded to titanium (531.7 ev (O1s)) was obtained. The area ratio (O1s/Ti2p) was found to be 1.92. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.92. The sample was further left for 1 month, but no change was found on the area ratio (O1s/Ti2p).

The samples before and after the plasma treatment above were each subjected to X-ray diffraction analysis, and, as a result, no change was observed between the anatase type titanium dioxide samples obtained before and after the plasma treatment.

Furthermore, the ESR spectra of the samples before and after the treatment were obtained. The measurements were performed in the same manner as in Example 4. As a result, similar to the case in Example 4, a signal was observed at a g value of 2.003 to 2.004 for the catalyst (an anatase type titanium dioxide subjected to plasma treatment) obtained in Example 5. Moreover, this peak was found to be maintained on re-measuring the sample after allowing it to stand in air for 1 week. Further, no signal assigned to $Ti^3$, which should appear at a g value of 1.96, was found for the catalyst obtained in Example 5.

Example 6

A 4-g portion of a powder of an anatase type titanium dioxide (ST-01, manufactured by Ishihara Sangyo Kaisha) was placed inside a quartz reaction tube 200 ml in volume. An electric heating wire heater was attached to the quartz reaction tube, and after evacuating the inside of the system to a vacuum degree of 0.1 Torr or lower by using a vacuum pump, the entire reaction tube was heated to a temperature of 400° C. by the heater. Heating was continued to maintain the temperature to 400° C. for an hour.

During the treatment, the evacuation was continued by using a vacuum pump to maintain the vacuum degree to 0.1 Torr or lower. Thus, a dark brown colored powder was obtained after 1 hour.

The anatase type titanium dioxide powder thus obtained was subjected to X-ray photoelectron spectroscopy, and the area of the peaks assigned to the 2p-electron of titanium (459.5 eV ($Ti2p_{3/2}$) and 465.4eV ($Ti2p_{1/2}$)) as well as that of the peak as signed to the 1s-electron of the oxygen bonded to titanium (530.0 ev (O1s)) was obtained. The area ratio (O1s/Ti2p) was found to be 1.92. The area ratio (O1s/Ti2p) of an anatase type titanium dioxide powder not subjected to plasma treatment was 2.00.

The sample was left to stand in air for 1 week, and the area ratio was obtained by performing the same measurement to b obtain an area ratio (O1s/Ti2p) of 1.92. The sample was further left for 1 month, but no change was found on the area ratio (O1s/Ti2p).

The samples before and after the plasma treatment above were each subjected to X-ray diffraction analysis, and, as a result, no change was observed between the anatase type titanium dioxide samples obtained before and after the plasma treatment.

Test Example 4
(Measurement of NOx Oxidation Activity)

The NOx oxidation activity of the samples prepared in Example 6 was measured under the same conditions as those used in Test Example 2. The results are given in Table 3. It can be understood that the sample obtained in Example 6 yields an activity slightly lower (particularly in the short wavelength regions) than that of the sample obtained in Example 4, however, the activity was observed to a wavelength in the vicinity of 600 nm.

TABLE 3

| | Wavelength (nm) | | |
| --- | --- | --- | --- |
| | 360 | 460 | 560 |
| | NO removal ratio (%) | | |
| Example 6 | 18.3 | 16.2 | 4.7 |
| Starting material (ST-01) | 28.1 | 0.2 | 0 |

Test Example 5
(Test on the Reduction of Benzoic Acid)

A photodecomposition test of benzoic acid was performed by using the sample prepared in Example 6 under the same conditions as those used in Test Example 3.

As a result, the decomposition ratio of benzoic acid after 48 hours was found to be 15.42%. However, no decomposition of benzoic acid was found in case of using titanium oxide employed for the starting material under the conditions above.

Example 7

A 5-g portion of a powder of an anatase type titanium dioxide (ST-01, manufactured by Ishihara Sangyo Kaisha) was placed inside a quartz reaction tube 5 cm in inner diameter and 100 cm in length. A RF plasma generating apparatus was attached to the quartz reaction tube, and after evacuating the inside of the reaction tube system to 0.05 Torr by using a vacuum pump, a 500-W power electromagnetic wave (at a frequency of 13.56 GHz) was irradiated to the powder of anatase type titanium dioxide placed inside the reaction tube to thereby generate a plasma. Then, gaseous $H_2$ was introduced inside the system at a flow rate of 500 ml/min to set the pressure inside the system to about 1 Torr. The treatment was continued for 30 minutes while stirring the anatase type titanium dioxide powder placed inside the reaction tube. Further, the wall of the quartz tube was heated to 400° C. by resistance heating using a nichrome wire, and was maintained at the same temperature throughout the reaction.

The anatase type titanium dioxide powder thus obtained was subjected to X-ray photoelectron spectroscopy (XPS), and the area of the peaks assigned to the 2p-electron of titanium (458.8 eV ($Ti2p_{3/2}$) and 464.6 ev ($Ti2p_{1/2}$)) as well as that of the peak assigned to the 1s-electron of the oxygen bonded to titanium (531.7 eV (O1s)) was obtained. The area ratio (O1s/Ti2p) was found to be 1.51. The area ratio (O1s/Ti2p) of an anatase type titanium dioxide powder not subjected to plasma treatment was 2.00.

The sample was left to stand in air for 1 week, and the area ratio was obtained by performing the same measurement to obtain an area ratio (O1s/Ti2p) of 1.51. The sample was further left for 1 month, but no change was found on the area ratio (O1s/Ti2p).

Example 8
Plasma Treatment of Zirconia

A 2-g portion of $ZrO_2$ manufactured by Kishida Kagaku K. K. was placed inside a 280-ml volume quartz reaction tube. The quartz reaction tube was connected to a plasma generating apparatus, and after evacuating the inside of the system by using a vacuum pump, a 400-W power electromagnetic wave (at a frequency of 2.45 GHz) was irradiated to the zirconia powder placed inside the reaction tube to thereby generate a plasma by using a Tesla coil. Then, gaseous $H_2$ was introduced inside the system at a flow rate of 30 ml/min to set the pressure inside the system to about 1 Torr. The treatment was continued for 30 minutes while stirring the zirconia powder placed inside the reaction tube.

The thus obtained zirconium oxide powder was subjected to x-ray photoelectron spectroscopy, and the area of the peaks assigned to the 3d-electron of zirconium (182 to 183 eV ($Zr3d_{5/2}$) and 184 to 185 eV ($Zr3d_{3/2}$)) as well as that of the peak assigned to the 1s-electron of the oxygen bonded to zirconium (530 eV (O1s)) was obtained. The area ratio (O1s/Zr3d) was found to be 1.98. The area ratio (O1s/Zr3d) of zirconium oxide powder not subjected to plasma treatment was 2.01.

The sample was left to stand in air for 1 week, and the area ratio was obtained by performing the same measurement to obtain an area ratio (O1s/Zr3d) of 1.98. The sample was further left for 1 month, but no change was found on the area ratio (O1s/Zr3d).

Test Example 6

A 0.2-g portion of the samples prepared in Example 8 was placed inside a glass bell jar-type reaction apparatus (1.9 liter in volume). As the light source, a halogen lamp (JDR100V 75WN/S-EK manufactured by Toshiba Lightech Co., Ltd.) was used together with a glass filter to cut off ultraviolet radiations 390 nm or shorter in wavelength. The center luminance of the light source was 100,000 Lx.

After sufficiently evacuating the inside of the system, acetaldehyde was injected into the reaction vessel to prepare a reaction gas having the predetermined concentration (500 ppm) After the adsorption equilibrium of acetaldehyde was achieved, light irradiation was performed for a predetermined duration of time. The reaction gas was analyzed by using gas chromatography (FID). The concentration of acetaldehyde 120 minutes after initiating the light irradiation is shown in the Table 4 below. For comparison, the acetaldehyde was measured 120 minutes after the initiation of the light irradiation for a zirconia starting material not subjected to plasma treatment, and the results are shown in Table 4.

Test Example 7

A 0.2-g portion of the sample prepared in Example 8 was placed inside a glass bell jar-type reaction apparatus (1.9 liter in volume). As the light source, a black lamp (H110BL, manufactured by Iwasaki Denki Co., Ltd.) having a UV intensity of 1.8 mW/cm$^2$ was used to irradiate ultraviolet radiations in the UVa region.

After sufficiently evacuating the inside of the system, acetaldehyde was injected into the reaction vessel to prepare a reaction gas having the predetermined concentration (500 ppm). After the adsorption equilibrium of acetaldehyde was achieved, light irradiation was performed for a predetermined duration of time. The reaction gas was analyzed by using gas chromatography (FID). The concentration of acetaldehyde 120 minutes after initiating the light irradiation is shown in the Table 4 below. For comparison, the acetaldehyde was measured 120 minutes after the initiation of the light irradiation for a zirconia starting material not subjected to plasma treatment, and the results are shown in Table 4.

TABLE 4

| | Halogen lamp (radiations 390 nm or shorter in wavelength cut off) | Black light |
|---|---|---|
| Example 8 | 268 ppm | 250 ppm |
| Comparative Example 2 (zirconia starting material) | 499 ppm | 489 ppm |

From the results shown in Table 4, it can be understood that the hydrogen-plasma treated zirconia prepared in accordance with the production method of the present invention exhibits high ability in the photodecomposition of acetaldehyde under irradiation of UVa and visible light; thus, it functions as a photocatalyst under the irradiation of a visible light. Furthermore, zirconia used as the starting material in Comparative Example 2 had no photodecomposition effect on acetaldehyde under the irradiation of a visible light or an ultraviolet radiation.

Example 9
Plasma Treatment of Rutile Type $TiO_2$

A 2-g portion of a rutile type $TiO_2$ (MT-500B) manufactured by Teika Inc. was placed inside a 280-ml volume quartz reaction tube. The quartz reaction tube was connected to a plasma generating apparatus, and after evacuating the inside of the system by using a vacuum pump, a 400-w power electromagnetic wave (at a frequency of 2.45 GHz) was irradiated to the rutile type titanium oxide powder placed inside the reaction tube to thereby generate a plasma by using a Tesla coil. Then, gaseous $H_2$ was introduced inside the system at a flow rate of 30 ml/min to set the pressure inside the system to about 1 Torr. The treatment was continued for 30 minutes while stirring the rutile type titanium oxide powder placed inside the reaction tube. As a result, a bluish pale gray powder was obtained. The samples before and after the plasma treatment above were each subjected to X-ray diffraction analysis, and, as a result, no change was observed on the rutile type titanium dioxide obtained before and after the plasma treatment.

The thus obtained rutile type titanium dioxide powder was subjected to X-ray photoelectron spectroscopy, and the area of the peaks assigned to the 2p-electron of titanium (458.6 eV ($Ti2p_{3/2}$) and 464.2eV ($Ti2p_{1/2}$)) as well as that of the peak as signed to the 1s-electron of the oxygen bonded to titanium (529.8 eV (O1s)) was obtained. The area ratio (O1s/Ti2p) was found to be 1.74. The area ratio (O1s/Ti2p) of rutile type titanium dioxide powder not subjected to plasma treatment was 2.01. Further, the sample was left to stand in air for 1 week, and the area ratio was obtained by performing the same measurement to obtain an area ratio (O1s/Ti2p) of 1.74. The sample was further left for 1 month, but no change was found on the area ratio (O1s/Ti2p).

A 0.2-g portion of the sample prepared above was placed inside a glass bell jar-type reaction apparatus (1.9 liter in volume). As the light source, a halogen lamp (JDR110V 75WN/S-EK manufactured by Toshiba Lightech Co., Ltd.) was used together with a glass filter to cut off ultraviolet radiations 390 nm or shorter in wavelength. The center luminance of the light source was 100,000 Lx.

After sufficiently evacuating the inside of the system, acetaldehyde was injected into the reaction vessel to prepare a reaction gas having the predetermined concentration (500 ppm). After the adsorption equilibrium of acetaldehyde was achieved, light irradiation was performed for a predetermined duration of time. The reaction gas was analyzed by using gas chromatography (FID). The concentration of acetaldehyde 120 minutes after initiating the light irradiation is shown in the Table 5. For comparison, the acetaldehyde was measured 50 minutes after the initiation of the light irradiation for a rutile type $TiO_2$ not subjected to plasma treatment, and the results are shown in Table 5.

TABLE 5

| | Halogen lamp (radiations 390 nm or shorter in wavelength cut off) |
|---|---|
| Example 9 | 264 ppm |
| Comparative Example 3 (rutile type titanium oxide starting material) | 302 ppm |

From the results shown in Table 5, it can be understood that the hydrogen-plasma treated rutile type titanium oxide prepared in accordance with the production method of the present invention exhibits high ability in the photodecomposition of acetaldehyde under irradiation of visible light; thus, it functions as a photocatalyst under the irradiation of a visible light. On the other hand, the rutile type titanium oxide used as the starting material in Comparative Example 3 showed photodecomposition properties on acetaldehyde under the irradiation of a visible light, but the effect was weaker as compared with the sample obtained in Example 3.

Example 10
Plasma Treatment of Hafnium Oxide

A 2-g portion of hafnium oxide ($HfO_2$ of 99.8% purity, manufactured by Fluka Inc.) was placed inside a 200-ml volume quartz reaction tube. The quartz reaction tube was connected to a plasma generating apparatus, and after evacuating the inside of the system by using a vacuum pump, a 400-W power electromagnetic wave (at a frequency of 2.45 GHz) was irradiated to the hafnium oxide powder placed inside the reaction tube to thereby generate a plasma by using a Tesla coil. Then, gaseous $H_2$ was introduced inside the system while controlling the flow rate to 30 ml/min by using a mass flow meter, such that the pressure inside the system was set to about 1 Torr. The treatment was continued for 1 hour while rotating the quartz reaction tube and stirring the hafnium oxide powder placed inside the reaction tube. As a result, a powder having a gray surface was obtained.

The thus obtained hafnium oxide powder was subjected to X-ray photoelectron spectroscopy, and the area of the peaks assigned to the 4f-electron of hafnium (16 to 17 eV (Hf4f)) as well as that of the peak assigned to the 1s-electron of the oxygen bonded to hafnium (530 eV (O1s)) was measured. The area ratio (O1s/Hf4f) was found to be 2.15. The area ratio (O1s/Hf4f) of hafnium oxide powder not subjected to plasma treatment was 2.20.

The sample was left to stand in air for 1 week, and the area ratio was obtained by performing the same measurement to obtain an area ratio (O1s/Hf4f) of 2.15. The sample was further left for 1 month, but no change was found on the area ratio (O1s/Hf4f).

A 0.4-g portion of the sample prepared above was dispersed in methanol, and was applied to a glass plate (6×6 cm). The glass plate was then set inside a glass bell jar-type reaction apparatus (1.9 liter in volume). As the light source, a halogen lamp (JDR110V 75WN/S-EK manufactured by Toshiba Lightech Co., Ltd.) was used together with a glass filter to cut off ultraviolet radiations 420 nm or shorter in wavelength.

After sufficiently evacuating the inside of the system, acetaldehyde was injected into the reaction vessel to prepare a reaction gas having the predetermined concentration (500 ppm) After the adsorption equilibrium of acetaldehyde was achieved, light irradiation was initiated. The reaction gas was analyzed by using gas chromatography (FID). The concentration of acetaldehyde at 90 minutes after the initiation of the irradiation was found to be 420 ppm. Separately, a 0.4-g portion of an untreated hafnium oxide powder was similarly coated to obtain a sample, and the sample was subjected to the test. However, no change in acetaldehyde concentration was found before and after the irradiation of light. From the above results, it can be understood that the hydrogen plasma treated hafnium oxide prepared in accordance with the production method of the present invention exhibits photodecomposition properties on acetaldehyde under the irradiation of a visible light, and that it functions as a photocatalyst using visible light.

Example 11
Plasma Treatment of Strontium Titanate

A 2-g portion of strontium titanate ($SrTiO_2$ of 99% purity and consisting of particles 5 μm or less in diameter, manufactured by Aldrich Chemical Company) was placed inside a 200-ml volume quartz reaction tube. The quartz reaction tube was connected to a plasma generating apparatus, and after evacuating the inside of the system by using a vacuum pump, a 400-W power electromagnetic wave (at a frequency of 2.45 GHz) was irradiated to the strontium titanate powder placed inside the reaction tube to thereby generate a plasma by using a Tesla coil. Then, gaseous $H_2$ was introduced inside the system while controlling the flow rate to 30 ml/min by using a mass flow meter, such that the pressure inside the system was set to about 1 Torr. The treatment was continued for 1 hour while rotating the quartz reaction tube and stirring the strontium titanate powder placed inside the reaction tube. As a result, a powder having a gray surface was obtained.

A 0.2-g portion of the sample prepared above was dispersed in methanol, and was applied to a glass plate (6×6 cm). The glass plate was then set inside a glass bell jar-type reaction apparatus (1.9 liter in volume). As the light source, a halogen lamp (JDR110V 75WN/S-EK manufactured by Toshiba Lightech Co., Ltd.) was used together with a glass filter to cutoff ultraviolet radiations 420 nm or shorter in wavelength.

After sufficiently evacuating the inside of the system, acetaldehyde was injected into the reaction vessel to prepare a reaction gas having the predetermined concentration (500 ppm) After the adsorption equilibrium of acetaldehyde was achieved, light irradiation was initiated. The reaction gas was analyzed by using gas chromatography (FID). The concentration of acetaldehyde at 60 minutes after the initiation of the irradiation was found to be 450 ppm. Separately, a 0.4-g portion of an untreated strontium titanate powder was similarly coated to obtain a sample, and the sample was subjected to the test. However, no change in acetaldehyde concentration was found before and after the irradiation of light. From the above results, it can be understood that the hydrogen plasma treated strontium titanate prepared in accordance with the production method of the present invention exhibits photodecomposition properties on acetaldehyde under the irradiation of a visible light, and that it functions as a photocatalyst using visible light.

Example 12
Wet Solar Cell

The catalyst (powder) according to the present invention prepared in Example 1 was mixed with polyethylene glycol and acetone, and was applied to a transparent electrode (ITO). After coating, baking treatment was applied thereto at ca. 300° C. for time duration of 1 hour. The electrode thus obtained was immersed into a methanol solution containing a commercially available ruthenium complex (8RuL2 (NCS)2, L=4,4'-dicarboxy-2,2'-bispyridine). Then, a drop of aqueous solution containing 0.1 M of potassium iodide was applied to the resulting electrode. A transparent electrode (ITO) was superposed thereon to provide a counter electrode, and the surroundings were fixed with a resin to obtain a wet solar cell. A light emitted from a halogen lamp (JDR110V 75WN/S-EK manufactured by Toshiba Lightech Co., Ltd.) was irradiated to the battery through a glass filter which cuts off ultraviolet radiations 420 nm or shorter in wavelength. As a result, the generation of a photoelectric current was observed.

Similarly, a wet solar cell was prepared in the same manner as above by using the catalyst (powder) according to the present invention prepared in Example 4. A light emitted from a halogen lamp (JDR110V 75WN/S-EK manufactured by Toshiba Lightech Co., Ltd.) was irradiated to the battery through a glass filter which cuts off ultraviolet radiations 420 nm or shorter in wavelength. As a result, the generation of a photoelectric current was similarly observed.

Example 13
Wet Solar Cell

Wet solar cells were each prepared in the same manner as in Example 12 by using the samples obtained in Examples 1 and 4, except for using a polyaniline thin film electrode in the place of transparent electrode (ITO). A light emitted from a halogen lamp (JDR110V 75WN/S-EK manufactured by Toshiba Lightech Co., Ltd.) was irradiated to each of the cells through a glass filter which cuts off ultraviolet radiations 420 nm or shorter in wavelength. As a result, the generation of a photoelectric current was similarly observed.

Example 14
Test on Water Decomposition using Visible Light

A 0.3-g portion of the photocatalyst prepared in Example 1, water (pH7, 30 ml in volume), and a magnetic stirrer were set inside a reaction vessel, and the entire system was connected to a vacuum evacuation line (500 ml in volume). A 500-W xenon lamp was used as the light source, and a glass filter to cut off ultraviolet radiations 420 nm or shorter in wavelength was incorporated.

After sufficiently evacuating the inside of the system, the irradiation of light was initiated. Gaseous hydrogen generated in the system was collected every 5 hours, and was analyzed by gas chromatography (TCD). Gaseous hydrogen was generated at a rate of 0.02 $\mu$mol/h.

Example 15
Test on the Reduction of Carbon Dioxide Using Visible Light

A 0.3-g portion of the photocatalyst prepared in Example 1 was dispersed in methanol, and after coating the resulting dispersion to a glass plate (6 cm×6 cm), the sample was heated at 300° C. for 1 hour to obtain a sample which is less apt to cause powder desorption. After placing the glass plate coated with the photocatalyst inside a 1-liter volume reaction vessel, the vessel was connected to a vacuum evacuation line (500 ml in volume). After evacuating the system, gaseous carbon dioxide (500 ppm) passed through a water vapor phase was injected into the reaction vessel. A 500-W xenon lamp was used as the light source, and a glass filter to cut off ultraviolet radiations 420 nm or shorter in wavelength was incorporated. Gas chromatography (TCD) was used for the analysis of the gas evolved.

Visible and infrared radiations were irradiated to the reaction vessel, and the mixed gas inside the reaction vessel was analyzed every time of irradiation, and was found that methanol generated at a rate of 2 $\mu$mol/h.

As described above, the present invention provides photocatalysts having activity under the irradiation of visible light, and by using the catalysts, substances such as acetaldehyde, NOx, benzoic acid, etc., can be photo decomposed.

The material according to the present invention can be applied to various fields using the activity under visible light.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A catalyst having activity under an irradiation of visible light in a wavelength region from about 400 to 600 nm, comprising titanium dioxide having stable oxygen defects and exhibiting NOx oxidation activity under the irradiation of a visible light at least in the wavelength region of from about 400 to 600 nm; and said titanium dioxide further having a peak area ratio (O1s/Ti2p) of a peak area obtained by X-ray photoelectron spectroscopy assigned to the 1s electrons of oxygen (O1s) participating in the bonds with titanium to a peak area obtained by X-ray photoelectron spectroscopy assigned to the 2p electrons of titanium (Ti2p) of 1.99 or lower.

2. The catalyst according to claim 1, wherein said titanium dioxide component comprises titanium dioxide of an anatase type or a rutile type.

3. The catalyst according to claim 1, wherein the titanium dioxide has a primary particle size of 10 nm or less in diameter.

4. The catalyst according to claim 1, comprising titanium dioxide that is characterized by an X-ray diffraction (XRD) pattern that is substantially free from patterns other than patterns assigned to anatase type titanium dioxide.

5. The catalyst according to claim 1, wherein said catalyst is in a substantially granular, thin-film, or sheet shape.

6. The catalyst of claim 1, wherein said catalyst material has been provided on the surface of a base material substrate.

7. The catalyst article according to claim 6, wherein said base material is an exterior wall of a building, an exterior plane of a roof or a ceiling, an outer plane or an inner plane of a window glass, an interior wall of a room, a floor or a ceiling, a blind, a curtain, a protective wall of highway roads, an inner wall inside a tunnel, an outer plane or a reflective plane of an illuminating light, an interior surface of a vehicle, or a plane of a mirror.

8. A catalyst having activity under an irradiation of visible light, said catalyst comprising titanium dioxide having stable oxygen defects and a peak area ratio (O1s/Ti2p) of a peak area obtained by X-ray photoelectron spectroscopy assigned to the 1Is electrons of oxygen (O1s) participating in the bonds with titanium to a peak area obtained by X-ray photoelectron spectroscopy assigned to the 2p electrons of titanium (Ti2p) of 1.99 or lower.

9. The catalyst according to claim 8, wherein said peak area ratio (O1s/Ti2p) is in a range of from 1.5 to 1.95.

10. The catalyst according to claim 8, wherein said peak area ratio (O1s/Ti2p) remains substantially constant for time durations of 1 week or longer.

11. The catalyst according to claim 8, wherein said activity under the irradiation of visible light is an oxidation activity or a reduction activity.

12. The catalyst according to claim 8, wherein said activity under the irradiation of visible light is a decomposition activity for inorganic and organic substances, or a bactericidal activity.

13. A method for producing a catalyst comprising titanium dioxide having stable oxygen defects and a ratio of a peak area obtained by X-ray photoelectron spectroscopy assigned to the 1s electrons of oxygen participating in the bonds with titanium to a peak area obtained by X-ray photoelectron spectroscopy assigned to the 2p electrons of titanium (O1s/Ti2p) of 1.99 or lower and having activity under an irradiation of a visible light, said method comprising treating the titanium dioxide with hydrogen plasma, characterized by performing said treatment in a state substantially free from an intrusion of air into a treatment system.

14. The method for producing a catalyst according to claim 13, wherein said treatment is performed in a tightly sealed system and said state substantially free from the intrusion of air into the treatment system is a state in which a vacuum degree inside the tightly sealed system takes at least 10 minutes to make a change of 1 Torr.

15. The method for producing a catalyst according to claim 13, wherein said oxide semiconductor is selected from the group consisting of titanium dioxide, zirconium oxide, hafnium oxide, strontium titanate, a titanium oxide-zirconium oxide based complex oxide, and a silicon oxide-titanium oxide based complex oxide.

16. The method for producing a catalyst according to claim 13, wherein said oxide semiconductor is an anatase type titanium dioxide.

17. A catalyst produced by the method of claim 13 and having activity under the irradiation of a visible light.

18. The catalyst according to claim 17, wherein said oxide semiconductor is titanium dioxide, zirconium oxide, hafnium oxide, strontium titanate, a titanium oxide-zirconium oxide based complex oxide, or a silicon oxide-titanium oxide based complex oxide.

19. A method for producing a catalyst comprising titanium dioxide having stable oxygen defects and a ratio of a peak area obtained by X-ray photoelectron spectroscopy assigned to the 1s electrons of oxygen participating in the bonds with titanium to a peak area obtained by X-ray photoelectron spectroscopy assigned to the 2p electrons of titanium (O1s/Ti2p) of 1.99 or lower and having activity under an irradiation of a visible light, said method comprising treating the titanium dioxide with a plasma of rare gas, and performing said treatment in a state substantially free from an intrusion of air into a treatment system.

20. The method for producing a catalyst according to claim 19, wherein said state substantially free from the intrusion of air into the treatment system is a state in which a vacuum degree inside a tightly sealed system takes at least 10 minutes to make a change of 1 Torr.

21. The method for producing a catalyst according to claim 19, wherein said oxide semiconductor is selected from the group consisting of titanium dioxide, zirconium oxide, hafnium oxide, strontium titanate, a titanium oxide-zirconium oxide based complex oxide, and a silicon oxide-titanium oxide based complex oxide.

22. The method for producing a catalyst according to claim 19, wherein said oxide semiconductor is an anatase type titanium dioxide.

23. A catalyst produced by the method of claim 19 and having activity under the irradiation of a visible light.

24. The catalyst according to claim 23, wherein said oxide semiconductor is titanium dioxide, zirconium oxide, hafnium oxide, strontium titanate, a titanium oxide-zirconium oxide based complex oxide, or a silicon oxide-titanium oxide based complex oxide.

25. A method for producing a catalyst comprising titanium dioxide having stable oxygen defects and a ratio of a peak area obtained by X-ray photoelectron spectroscopy assigned to the 1s electrons of oxygen participating in the bonds with titanium to a peak area obtained by X-ray photoelectron spectroscopy assigned to the 2p electrons of titanium (O1s/Ti2p) of 1.99 or lower and having activity under an irradiation of visible light, comprising the step of introducing ions of a rare gas on at least a portion of the surface of the titanium dioxide by means of ion implantation.

* * * * *